(12) United States Patent
Shver

(10) Patent No.: US 6,289,035 B1
(45) Date of Patent: Sep. 11, 2001

(54) MOUNTING ARRANGEMENT FOR AUXILIARY BURNER OR LANCE

(76) Inventor: Valery G. Shver, 9981 Timberstone Rd., Alpharetta, GA (US) 30022

(*) Notice: Subject to any disclaimer, the term of this patent is extended or adjusted under 35 U.S.C. 154(b) by 0 days.

(21) Appl. No.: 09/502,064

(22) Filed: Feb. 10, 2000

(51) Int. Cl.⁷ .................................................... H05B 7/22
(52) U.S. Cl. .................................. 373/66; 373/2; 373/72
(58) Field of Search ................................. 373/2, 8, 9, 24, 373/60, 66, 71, 72, 85; 266/189

(56) References Cited

U.S. PATENT DOCUMENTS

| | | | |
|---|---|---|---|
| 4,730,336 | * | 3/1988 | Herneisen et al. ......................... 373/2 |
| 5,166,950 | * | 11/1992 | Jouvaud et al. ............................ 373/2 |
| 5,373,530 | * | 12/1994 | Perrin ....................................... 373/85 |
| 5,444,733 | * | 8/1995 | Coassin et al. ............................ 373/72 |
| 5,471,495 | * | 11/1995 | Berger et al. ............................... 373/2 |

* cited by examiner

Primary Examiner—Tu Ba Hoang

(57) ABSTRACT

A mounting block and an improved mounting arrangement for apparatus used in metal melting, refining and processing, particularly those apparatus adapted to steel making in an electric arc furnace, such as burners, lances and the like with supersonic oxygen lancing capability. The mounting block is fluid cooled to survive the hostile environment of the electric arc furnace and is designed to rest on the step between the side wall and hearth of the furnace without any substantial change to the structure of the furnace. The mounting block comprises a plurality of fluid cooling conduits surrounding an aperture which is formed through the block and adapted to mount the apparatus. The mounting arrangement includes utilizing the mounting block to mount an apparatus with supersonic oxidizing gas or lancing capability in an electric arc furnace. The apparatus is mounted by passing it through an aperture in a water cooled side panel aligned with the mounting aperture in the mounting block. Because the mounting block is approximately the width of the step, the discharge opening of the apparatus is moved closer to the surface of the melt and toward the center of the furnace thereby providing increased efficiency. The discharge opening will now also extend past the inner edge of the step so that the oxidizing gas flow pattern does not degrade the hearth material and other furnace equipment mounted nearby.

15 Claims, 6 Drawing Sheets

UTILITIES
($H_2O$, GAS,
$O_2$, FLOW
MATERIALS,
ETC.)

MOUNTING ARRANGEMENT FOR AUXILIARY BURNER OR LANCE

BACKGROUND OF THE INVENTION

1. Field of the Invention

The present invention generally relates to an improved mounting device and mounting arrangement for apparatus used in metal melting, refining and processing, for example, steel making in an electric arc furnace (EAF), and more particularly, to an mounting arrangement for an auxiliary burner or lance relatively close to a molten metal bath to increase its efficiency.

2. Description of Background Art

An electric arc furnace makes steel by using an electric arc to melt one or more charges of scrap metal which is placed within the furnace. The scrap is charged by dumping it into the furnace through the roof from buckets which also may include charged carbon and slag forming materials. The arc melts the scrap into a molten pool of metal, called an iron carbon melt, which accumulates at the bottom or hearth of the furnace. After a flat bath has been formed by melting of all the scrap introduced, the electric arc furnace enters a refining or decarburizing phase. In this phase, the metal continues to be heated by the arc until the slag forming materials combine with impurities in the iron carbon melt and rise to the surface as slag. When the iron carbon melt reaches a boiling temperature, the charged carbon in the melt combines with any oxygen present in the bath to form carbon monoxide bubbles which rise to the surface of the bath. Generally, at this time supersonic flows of oxygen are blown at the bath with either lances or burners to produce a decarburization of the bath by the oxidation of the carbon contained in the bath. By simultaneously boiling the bath and injecting it with oxygen, the carbon content of the bath is reduced to under 2% carbon whereby the iron carbon melt becomes steel. The carbon in the steel bath is thereafter further reduced until the grade of steel desired is produced, down to less than 0.2% for low carbon steels.

To assist in the steel making process, auxiliary burners or lances can be used for the addition of thermal energy by the combustion of fuel, the injection of oxidizing gas for melt refining, foamy slag production or post combustion of carbon monoxide, and the injection of particulates for slag and foamy slag production. In many instances, the oxidizing gas is introduced as a high velocity stream that may exceed sonic velocities. Laval nozzles, or other supersonic nozzle types, are usually used in the production of high velocity streams of oxidizing gas for injection into a steel making furnace. These supersonic gas flows are produced by the converging/diverging shape of the nozzle which at above a critical pressure causes the gas flow though the nozzle to become supersonic. It is also highly desirable to provide a subsonic flow of oxidizing gas for the burning of fuel, including regular fuel and carbon monoxide for post combustion, for the addition of auxiliary thermal energy, and the supersonic oxygen flow for providing oxygen in iron melt decarburization, assisting in foamy slag production or post combustion of carbon monoxide.

An auxiliary oxy/fuel burner which is useful in the process of steel production in electric arc furnaces and which provides subsonic and supersonic flows of oxygen through the same centrally located conduit is shown to advantage in a technical publication entitled "Advanced Burner Design" by V. Shver, T. Pulliam, and M. Cohen (Shver, et al. I) dated November 1997. This burner is manufactured and commercially sold by Process Technology International, Inc. of Tucker, Ga., the assignee of the present invention. The subsonic flow is produced by providing a pressure in the supply conduit lower than the critical pressure of the supersonic nozzle being used in the conduit. When supersonic oxygen is needed, the pressure in the supply conduit is increased to above the critical pressure. The disclosure of Shver, et al. I is hereby incorporated by reference.

Another burner with the capability to introduce supersonic or subsonic oxidizing gas into an electric arc furnace is illustrated in U.S. Ser. No. 09/251,193, entitled "Method and Apparatus for Improved EAF Steelmaking", filed Feb. 15, 1999 in the name of V. Shver, and assigned commonly with the present application. Shver discloses an annular nozzle for producing a supersonic oxygen flow surrounding a carbon injection conduit forming a portion of a nozzle in a fluid cooled combustion chamber of the burner.

Still another burner with the capability to introduce supersonic or subsonic oxidizing gas into an electric arc furnace is illustrated in U.S. Ser. No. 09/459,303 entitled "Improved Method and Apparatus For Metal Melting, Refining and Processing", filed Dec. 10, 1999 in the names of V. Shver, et al. (Shver, et al. II), and assigned commonly with the present application. Shver, et al. II discloses a supersonic oxygen conduit in a side by side arrangement with a carbon injection conduit forming a portion of a nozzle in a fluid cooled combustion chamber of the burner.

Additionally, there are many other burners and lances which provide a supersonic oxidizing gas lancing capability and which provide for the introduction of other materials for use in an electric arc furnace.

The supersonic lancing mode is used in one instance for melt refining because the flow of oxygen must penetrate the molten metal in the hearth of the firnace. The increased velocity of the gas from accelerating it to a supersonic condition increases its momentum and thus depth of penetration into the melt. Another technique to increase the penetrating power of an oxidizing gas flow is to increase the flow rate by the use of a larger supersonic nozzle. While this advantageous to some extent, an excess of oxidizing gas is detrimental to the furnace components and the higher pressures needed for the larger nozzles rapidly become uneconomic.

The mounting of these burners and lances have generally been either through openings in the furnace which are used for other purposes, such as the slag door, roof holes or the EBT access panels, or in greater numbers through specially made openings in the water cooled panels of the side wall of the furnace. The specially made side wall openings allow the burners to be strategically mounted, for example, where there are cold spots in the furnace, or other desired places, possibly for the introduction of process materials. To improve the penetrating power and efficiency of the supersonic oxidizing gas flows from the burners, the mountings of the burners in the furnace side wall have been as far down on the side panels as possible. However, there has been a limit to the mounting of the burners in proximity to the melt because of the structure of many present day furnaces.

The hearth of the furnace is made of refractory materials to contain the molten metal during steel processing. The hearth of the furnace forms a step with the water cooled panels of the furnace side wall where they connect. In the past, the burners have been mounted high enough and at an suitable angle on the side walls where the introduced flows of super sonic oxygen or other materials will miss the edge of the step. Even for those instances where such flows miss the step, the is some deterioration of the refractory by the highly reactive oxidizing gas flowing closely past it. For apparatus providing supersonic oxidizing gas flow this means the mounting angle and flow rates are not only dictated by the steel making process requirements but also by the structure of the furnace.

Therefore, there is a need to mount burners and lances with supersonic oxidizing gas capability closer to the molten metal and directed more to the center of the furnace so they can be more efficient in operation.

There is also a need to mount these burners and lances at optimum angles, to operate them at optimum flow rates and at optimum distances from the melt.

SUMMARY OF THE INVENTION

The invention provides a mounting block for a burner, lance or similar apparatus and an improved arrangement for mounting such apparatus used in metal melting, refining and processing, particularly steel making in an electric arc furnace.

In one preferred embodiment, the mounting block is a fluid cooled free standing block having a mounting aperture for a burner which extends the discharge opening of the burner past the step of the furnace. The preferred implementation of the mounting block includes a front face adapted for the inner part of the furnace, a back face adapted to meet the side wall, and a width approximately that of the step between the side wall and the hearth of the furnace. In this manner, the mounting bock can rest on the step and be added to or removed from the furnace without any substantial change to the structure of the furnace. The mounting block is manufactured from a material which is strong enough to withstand the scrap charging and steel and slag splashing of the furnace while also exhibiting a relatively high thermal conductivity. Preferably, the material used for the block is cast iron which is inexpensive and can be easily produced with conduits for fluid cooling and the burner mounting aperture.

Another aspect of the invention provides the mounting block with a recess in its front face. An fluid cooled insert panel is then installed into the recess to provide additional cooling capacity for the front face of the mounting block. Because the front face of the mounting block may receive the direct radiation from the arc of the furnace, the insert is made out of a material of a high thermal conductivity, which may be the same as the mounting block or even a higher thermal conductivity, preferably copper.

According to another preferred embodiment of the invention, the mounting block further includes a slanted porch between its front face and back face. The slant of the porch lessens the area of the front face directly in line with the radiation of the arc while providing an increased area for fluid cooling. Further, the slant of the porch allows scrap to slide down into the molten bath and away from the mounting block. Optionally, slag retaining means, preferably in the form of cast channels or corrugations, are provided on the porch and the sides of the block to retain a covering of the splashed slag to form a protective barrier over the mounting block.

The mounting arrangement includes utilizing the mounting block to mount a burner or lance in a furnace, preferably a burner or lance with at least supersonic lancing capability and preferably in an electric arc furnace. The burner or lance is mounted by passing it through an aperture in a water cooled side panel aligned with the mounting aperture in the mounting block. Because the mounting block is approximately the width of the step, the discharge opening of the burner is moved by that distance closer to the center of the furnace. The flame discharge opening will now also extend past the inner edge of the sill so that the burner flow pattern is not such a problem to the hearth material and other furnace equipment mounted nearby.

Advantageously, the mounting aperture in the mounting block is formed at an optimum angle, preferably 45 degrees for supersonic oxidizing gas flow, for the size and flow rate of the burner being mounted. The distance to the surface of the melt is reduced so that the supersonic oxidizing gas flow rate may be determined by the amount of oxygen needed in the steel making process at a particular point, rather than a larger flow rate needed to produce the required penetration of the melt from farther away. This causes the supersonic oxidizing gas to impinge on the slag and the melt in the furnace at an optimum angle and with an optimum flow rate.

The radiation from the arc increases according to the square of the distance as apparatus is moved closer to the center of the furnace. The mounting block protects the apparatus from this harsh environment while it is located nearer the melt surface and center of the furnace while locating its discharge opening beyond the step to eliminate furnace structure considerations on the burner size and mounting particulars.

According to another aspect of the invention, locating the burner discharge opening nearer the center of the furnace by extending along the step with the mounting block also has the advantage of producing a point of impingement for the oxidizing gas which is closer to the center of the furnace for the same angle and height above the surface. This means more of the oxidizing gas can react with the melt at earlier times in the melting and refining cycle and less reacts with the hearth and other related furnace parts on the outer edge of the process.

These and other objects, aspects and features of the invention will be more clearly understood and better described when the following detailed description is read in conjunction with the attached drawings, wherein similar elements throughout the views have the same reference numerals, and wherein:

DETAILED DESCRIPTION OF A PREFERRED EMBODIMENT

Figure 1:
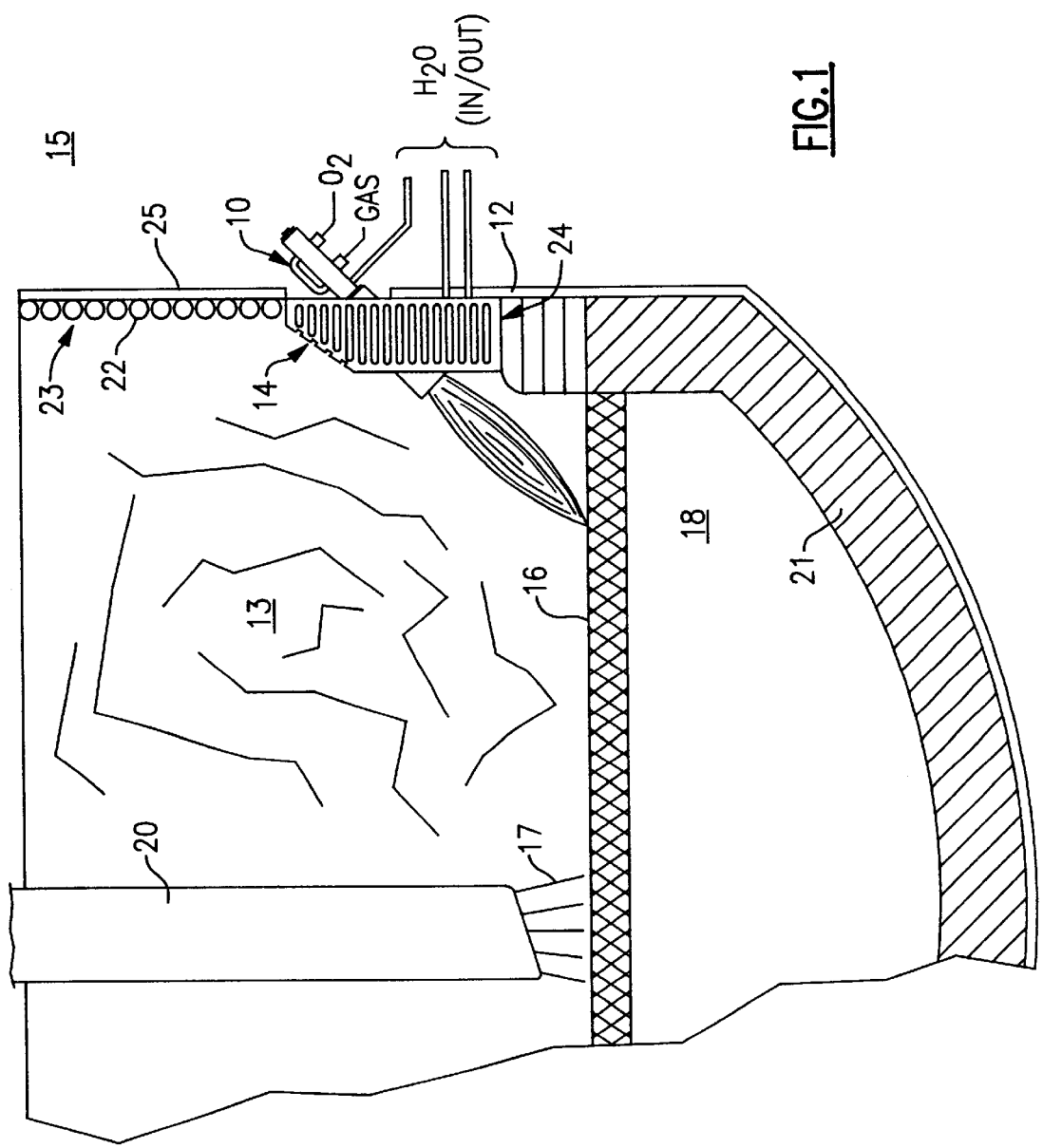
FIG. 1 is a partially cross-sectioned side view of the improved mounting arrangement for apparatus in an electric arc furnace.
Figure 2:
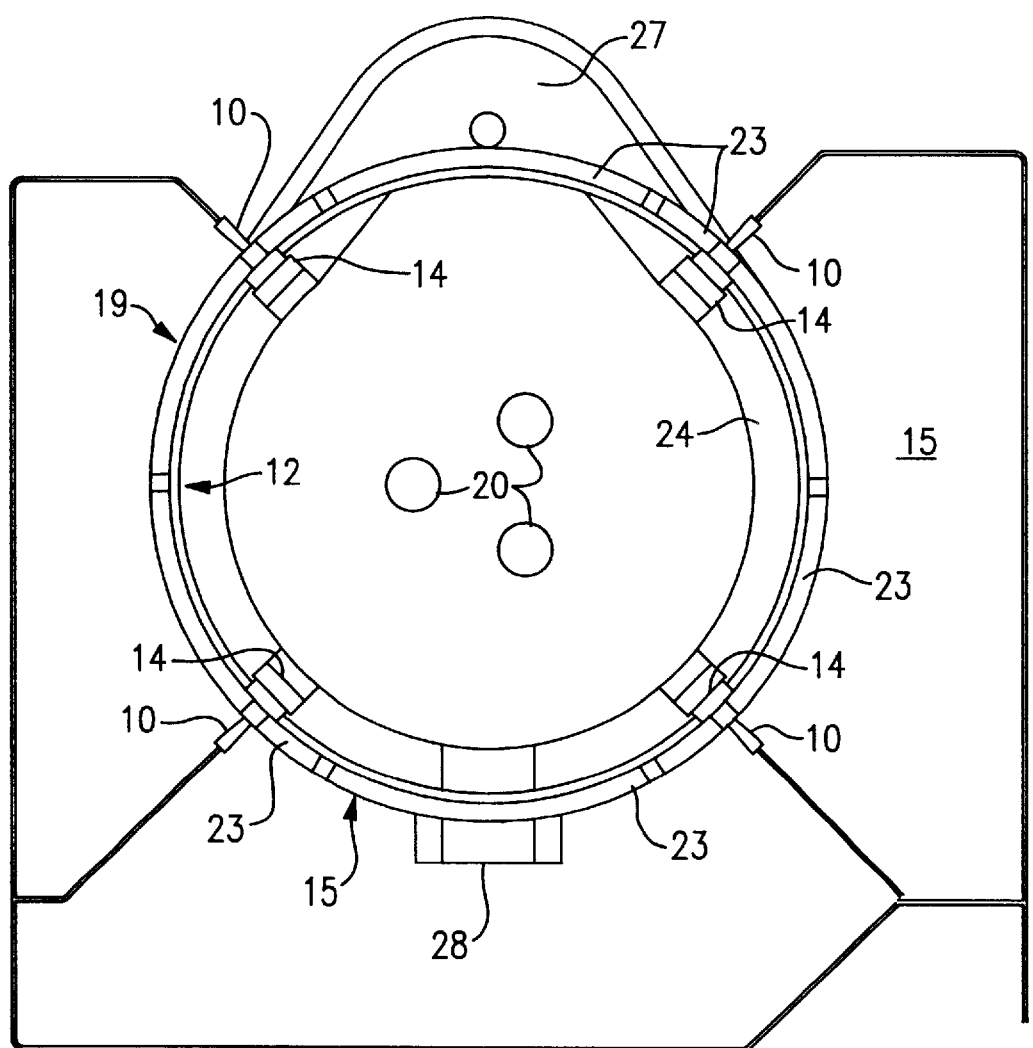
FIG. 2 is a partially cross-sectioned plan view of the mounting arrangement for the electric arc furnace illustrated in FIG. 1.
Figure 3:
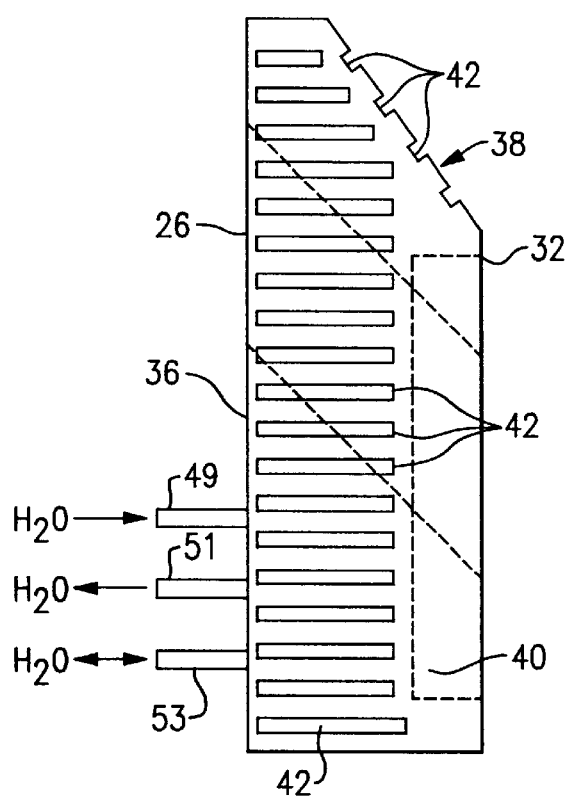
FIG. 3 is a side view of one embodiment of the mounting block illustrated in FIGS. 1 and 2.
Figure 4:
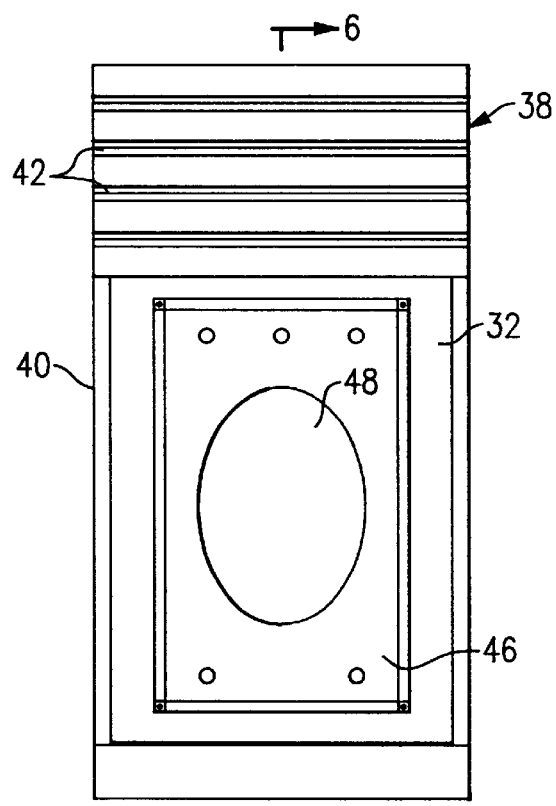
FIG. 4 is a front view of the mounting block illustrated in FIG. 3.
Figure 5:
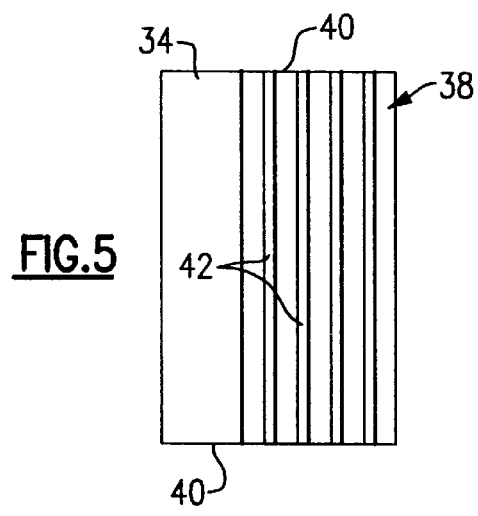
FIG. 5 is a top view of the mounting block illustrated in FIGS. 3.
Figure 6:
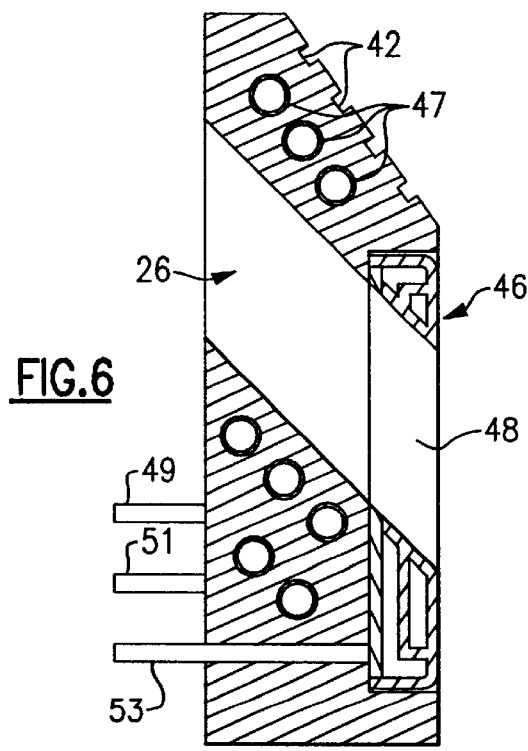
FIG. 6 is a cross-sectional side view of the mounting block illustrated in FIG. 3 taken along section line 3A—3A of that figure.
Figure 7:
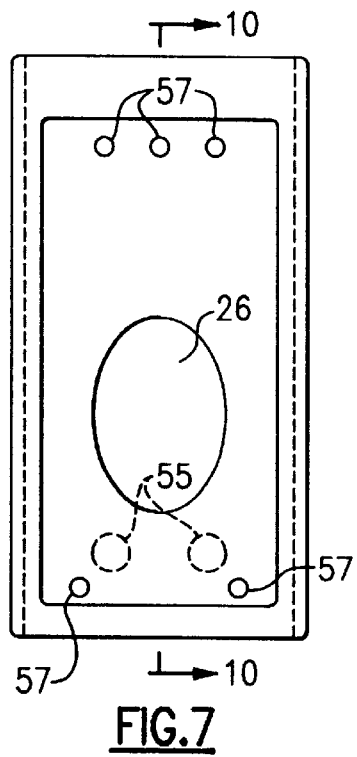
FIG. 7 is a front view of a second embodiment of the mounting block illustrated in FIGS. 1 and 2.
Figure 8:
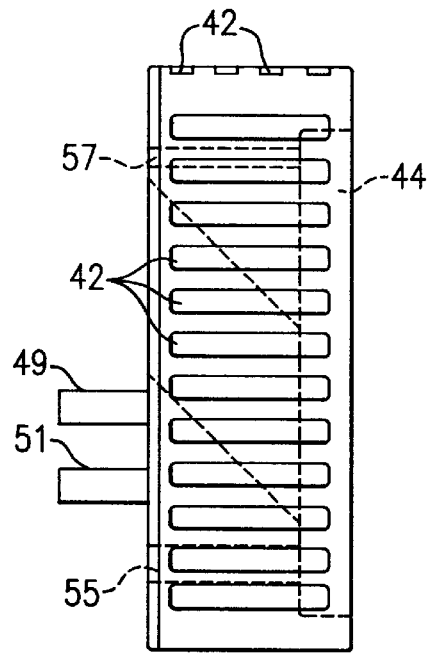
FIG. 8 is a side view of the mounting block illustrated in FIG. 7.
Figure 9:
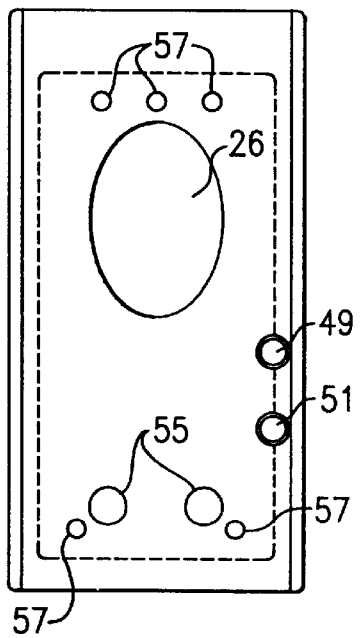
FIG. 9 is a back view of the mounting block illustrated in FIGS. 7.
Figure 10:
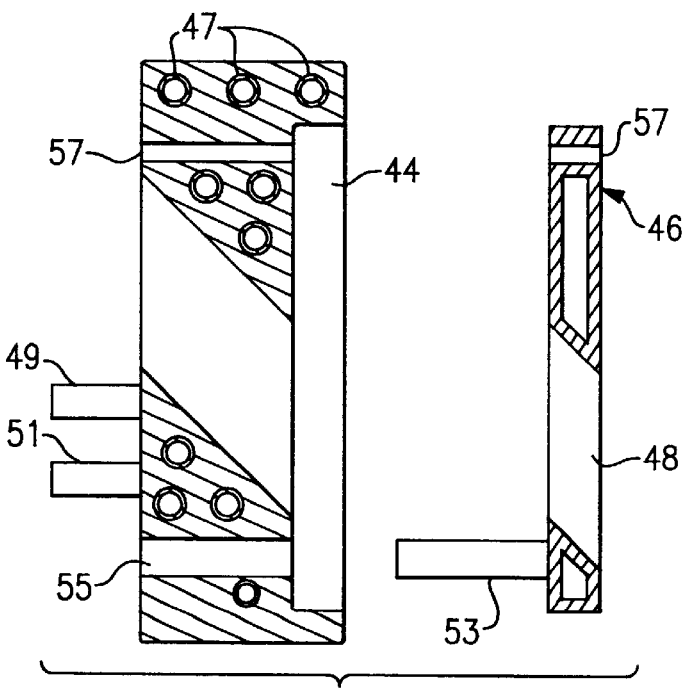
FIG. 10 is a cross-sectional side view of the mounting block illustrated in FIG. 7 taken along section line 7A—7A of that figure.

Referring to FIGS. 1 and 2, a plurality of burners 10 are adapted to operate in several different modes to provide auxiliary heating, metal refining and other metallurgical processing capabilities in an electric arc furnace (EAF) 15, or similar metal melting, refining and processing furnaces. Preferably, the burners 10 can be those described previously in the Shver, Shver, et al. I or II references, but they could also be other commercially available air fuel burners, oxygen fuel burners, or oxygen, air fuel burners. Also, while the preferred embodiments of the invention will be described using and mounting such burners, it will be evident that other similar apparatus, such as fixed lances or the like, can be used with the invention to produce advantageous results. The invention will be useful for any metal melting, refining or processing apparatus having a discharge opening whose efficiency can be increased by placing the discharge opening closer to the surface of the molten metal or closer to the center of the furnace. Particularly, the invention will be advantageous for those apparatus, such as the burners and lances, which have a lancing capability with a high velocity oxidizing gas, such as supersonic oxygen.

In FIG. 1 which shows a side view, the EAF 15 melts ferrous scrap 13, or other iron based materials, by means of an electric arc 17 produced from one or more electrodes 20 to collect a molten metal melt 18 at its hearth 21. The generally cup shaped hearth 21 is made of refractory material to withstand the intense heat of the molten metal. The hearth 21 of the EAF 15 is surrounded by an upper shell 19 which is comprised of a series of arcuate fluid cooled panels 23 as best seen in FIG. 2. It is known that the fluid cooled panels 23 forming the side wall 12 of the furnace 15 can be of several conventional types, such as those in the illustrated embodiment with an outer shell member 25 and a plurality of parallel cooling coils 22, an open arrangement of cooling coils with support columns (not shown), or several spray bar arrangements where an inner plate is sprayed with cooling fluid (not shown).

The melt 18 is generally covered with various amounts of slag 16 which is produced by chemical reactions between and the melt and slag forming materials added to the furnace before or during the melting process of the metal. Once the metal has been melted, the metal heat 18 is generally refined or decarburized by oxygen lancing. This reduces the carbon content of the metal to the grade of steel desired. During refining and thereafter, the metal melt 18 is typically heated by the electric arc 17 above its melting temperature. This superheating allows the melt to boil and form further slag from impurities and increases the carbon oxidation with the lanced oxygen. The superheating is also used to allow the metal heat 18 to remain fluid while being transported in a ladle or other carrier to another process step.

The burners 10 are preferably mounted through an opening in the fluid cooling coils 22 of a side wall panel 23 of the furnace 15 into generally rectangular shaped mounting blocks 14. In the illustrated embodiment, the mounting block 14 preferably rests on the step 24 formed between the panels 23 of the side wall of the upper shell of the furnace 15 and the refractory of the hearth 21, but could also be supported or suspended from a suitable structural member of the furnace. The mounting block 14 is shown located on the inside of the cooling coils 22 of the type of side wall panel 23 having an outer shell member 25. Similarly, such mounting block could be located on the inside of the cooling coils of an open coil type of side wall panel or the inside of a spray bar type side wall panel. When retrofitting an existing furnace with the mounting block 14, this configuration would be preferred because little change to the furnace structure would be needed. For new furnaces, or for newly manufactured replacement shells or panels, the mounting block 14 could also be integrated into the side wall panel 23 by removing the area of cooling coils 22 or the area of spray bars which contact the back face of the block 14.

The burner 10 is received in a mounting aperture 26 of the mounting block 14 so that its discharge opening is extended beyond the edge of the refractory hearth 21. This allows the flow of materials from the discharge opening of the burner 10 to miss the edge of the step so as to not degrade the refractory, particularly with a high velocity oxidizing gas. The mounting of the discharge opening of the burner 10 over the step also brings the material flows from the burner 10 close to the surface of the melt 18 and close to the center of the furnace thereby making the process operation more efficient. The mounting block 14 also provides protection for the burner 10 from the intense heat of the furnace 15 and mechanical damage from falling scrap 13.

The burners, or other apparatus, 10 are typically slanted downward at a mounting angle in the mounting aperture 26, preferably between 30–60 degrees, to direct a material flow 29 from the burner 10 comprised of combustion products, and/or other flows of injected materials, toward the metal melt 18 in the hearth 21 of the furnace. In addition to its downward inclination, the burners, or other apparatus, 10 may also optionally be directed from a radial direction (center of the furnace), preferably from 0–10 degrees. To cause suitable penetration of the melt 18 without splashing a supersonic flow of oxidizing gas, preferably oxygen, should impinge at an angle which is neither too shallow nor too steep. If the angle is too steep, excessive steel and slag splashing may occur. If the angle is too shallow, then the flow may not sufficiently penetrate the surface of the melt 18. Preferably, an angle of around 45 degrees has been found to be efficacious in producing desirable results from high velocity oxidizing gas lancing.

Depending upon the configuration of the furnace 15, as seen in FIG. 2 in plan view, the burners 10 may be mounted anywhere along on the side wall 12 of the upper shell. Individual burners 10 (not shown) may also be mounted in the sump 27 of the furnace 15, if it is an eccentric bottom tapping furnace, or above or in its slag door 28. Generally, a modern furnace 15 has more than one burner, or other apparatus, 10 mounted around its periphery; the number depending upon its size, configuration, melting power and operation.

Generally, such burners 10 are strategically located along the side wall 12 for a number of different purposes, for example, at the cold spots in the furnace to assist with the melting of the scrap. These cold spots are different for DC (Direct Current) furnaces and AC (Alternating Current) furnaces, and may be different even between these furnaces depending on size, manufacturer, and operating procedure of the furnace. Positioning may also depend on other factors such as the materials which are introduced into the furnace by the burner, or other apparatus, 10 and the purpose and timing of its introduction. Other materials which can be introduced include metallurgical and alloying agents, slag forming and foaming agents, oxidizing gases for refining, melting, decarburization, post combustion, etc. The mounting block 14 can be positioned and advantageous mount an apparatus wherever it needs to be on the side wall 12 of the furnace 15.

Whatever other functions or modes the burners, or other apparatus, 10 may have, it is important if an oxidizing gas lancing mode is provided, that they be close to the surface of the melt and directed more to the center of the furnace. The mounting block 14 provides a mounting extension past the water cooled panels 23 of the furnace 15 to allow the discharge opening of a burner 10 to reach beyond the step 24 of the refractory of the hearth 21 and be closer to the center of the furnace.

Each mounting block 14, as seen in one detailed embodiment in FIGS. 3–6, is a generally rectangular cast iron block with a front face 32 for facing the inside of the furnace and back face 36 for abutting the water cooled panel 23 of the furnace upper shell 19. The faces 32, 36 can be flat for ease of manufacture or curved to better conform to conventional circular furnace structure. The thickness of the sides 40 of the mounting block 14 is approximately the width of the refractory of the step 21 so that it can rest on the step with its back face adjacent the side wall panel 23 or furnace upper shell and be self supporting without major structural change to the furnace 15. A mounting aperture 26 is cast at the desired angle of mounting for the burner 10 and is aligned with the opening in the water cooled panel 23. The burner 10 slide mounts into the apertures until its discharge end extends just past the step where it can deliver combustion products, injected materials or, importantly, high velocity oxidizing gas, preferably supersonic oxygen, to the melt 18 without interference from or damage to the refractory of the hearth 21. Surrounding the mounting aperture 26 in the mounting block 14 are cooling channels in the form of coils 47 in which cooling fluid circulates. The coils 47 are connected to inlet pipe 49 and outlet pipe 51 which can be coupled to a supply of cooling fluid under pressure to circulate the fluid through the coils. The cooling fluid, preferably water, cools the surfaces of the mounting block 14 exposed to the furnace heat and the contact surface of the burner with the aperture.

Optionally, the front face 32 and top 34 of the mounting block 14 are connected by a sloping porch 38 which provides several advantageous protective functions. The porch 38 provides a sloping surface along which the scrap 13 may fall into the hearth 21. The porch 38 and sides 40 of the block are also cast with a plurality of generally square channels or corrugations 42. These channels or corrugations 42 are slag retainers which catch a covering of the slag when it splashes on the porch 38 or sides 40 of the block 14. This covering of slag which is less heat conductive than the mounting block 14 further protects the block from the internal heat of the furnace and radiation from the arc 17. It is evident that the channels 42 can be of various other shapes and configurations for retaining the slag.

As better seen in FIGS. 7–10, the mounting block 14 is optionally cast with a recess 44 in the front face 32. An insert panel 46 is installed in the recess 44 of the mounting block 14 and has a mounting aperture 48 aligned with the ones in the mounting block and the side wall 12. The insert panel 46 is preferably fluid cooled and has internal jackets through which a cooling fluid, preferably water, can circulate in the panel. These internal jackets are supplied with the cooling fluid via inlet and outlet connecting pipes 53. The inlet and outlet pipes 53 for the panel insert 46 pass through holes 55 formed in the mounting block 14 for that purpose. One manner of attaching the insert panel 46 to the mounting block 14 is by a plurality of through bolts which pass through holes 57 formed in the mounting block and corresponding holes 59 (only one shown) formed in the insert.

The insert panel 46 is preferably manufactured from a material with a high thermal conductivity. Because the panel 46 will face the most intense of the internal heat of the furnace and the radiation from the arc 17, it should be made of a material with the same or even a higher thermal conductivity than the mounting block 14. Preferably, the insert panel 46 is made of copper.

There are at least two, and often three, fluid cooling circuits for a mounting block 14 arrangement. There is a fluid circuit which cools the main block 14, another fluid circuit which cools the insert panel 46 and, optionally, a fluid circuit which cools the burner, or other apparatus, 10. Depending on the cooling needs of the particular installation and the availability of the utility service, the cooling circuits can be independently supplied by individual utility connections or can be serially connected to one supply. A less complex connecting arrangement can be provided with one supply, but the flow rate of the single system must exceed that necessary for the individual component having the highest flow rate. For independent supplies, different flow rates can be used without an undue increase in complexity. For example, the panel insert 46 may necessitate intense cooling and a higher fluid cooling rate than the mounting block 14 which may in turn need a higher cooling rate than the burner 10. It is further evident that any two of the individual components could have a shared supply and the other component an independent supply. An example of this configuration would be where the mounting block 14 and panel insert 46 were one cooling circuit and the burner 10 was coupled to an independent cooling circuit.

Figure 11:
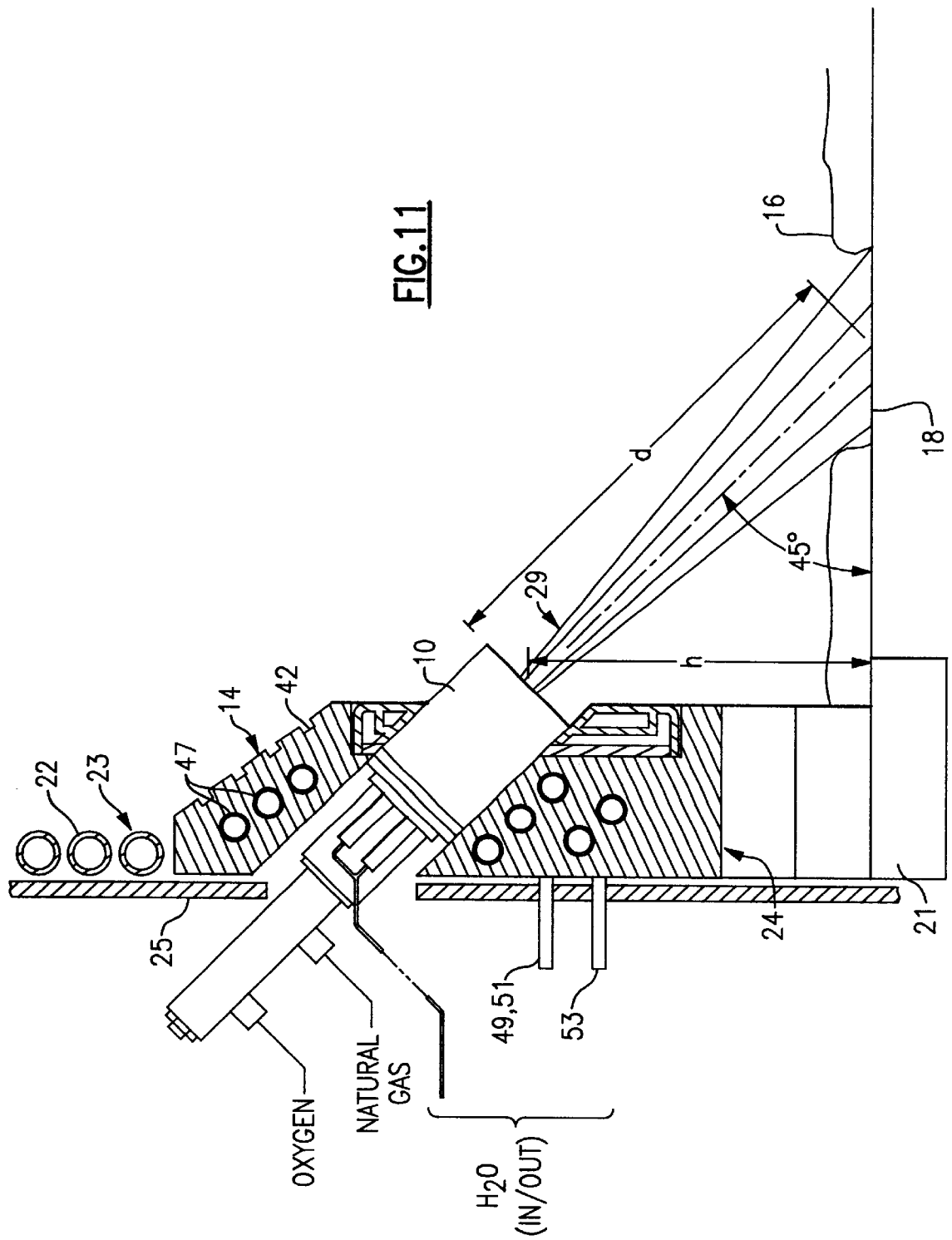
FIG. 11 is a partially cross-sectioned detailed side view of the improved mounting arrangement for apparatus in an electric arc furnace using the mounting block illustrated in FIGS. 3–6 which has been integrated into the side wall panel of the furnace.
Figure 12:
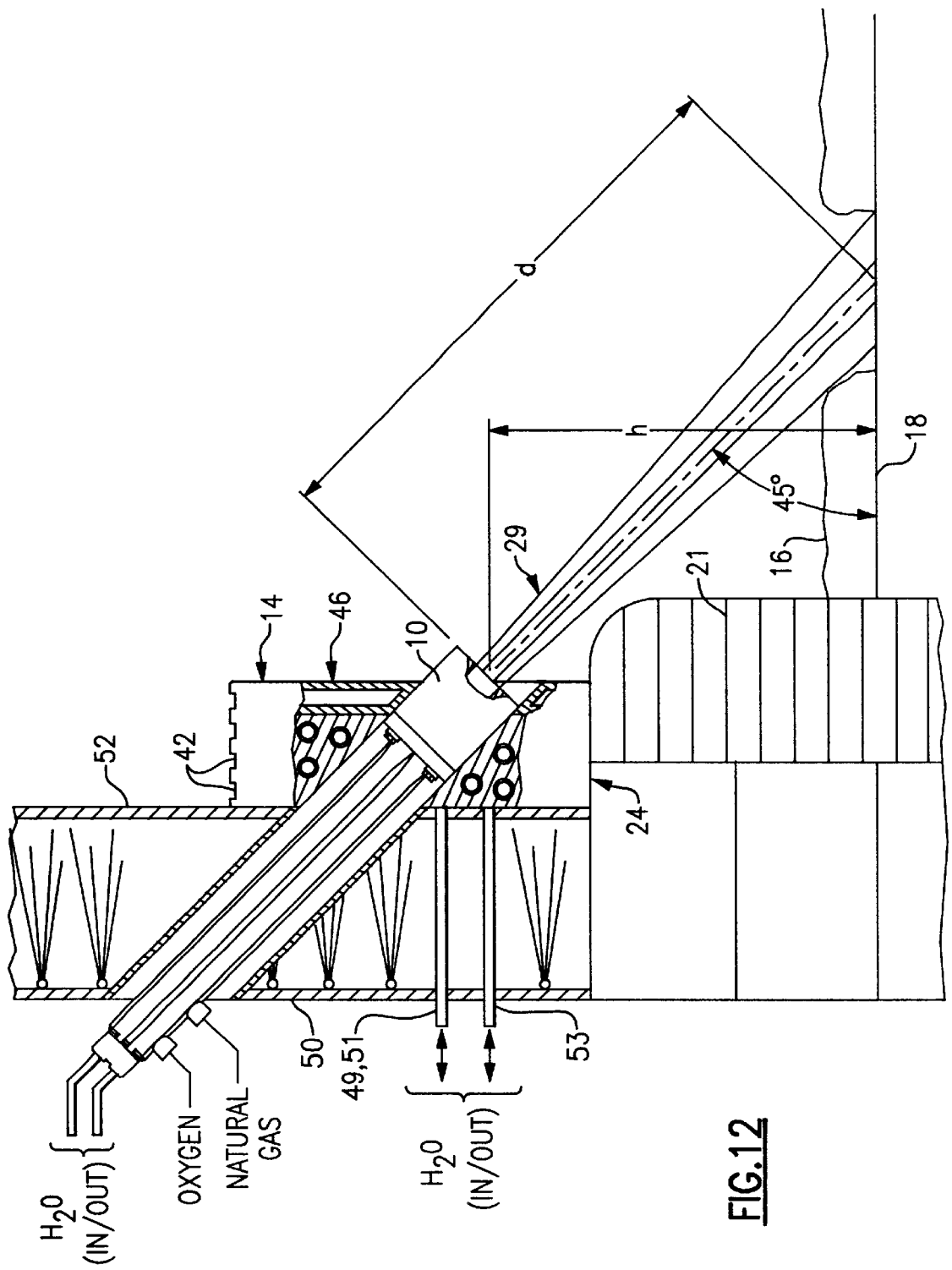
FIG. 12 is a partially cross-sectioned detailed side view of the improved mounting arrangement for apparatus in an electric arc furnace using the mounting block illustrated in FIGS. 7–10 which is used with a side wall panel of the furnace of the spray bar type.

FIG. 11 is a partially cross-sectioned detailed side view of the improved mounting arrangement for apparatus in an electric arc furnace using the mounting block illustrated in FIGS. 3–6 which has been integrated into the side wall panel 23 of the furnace 15. The cooling coils 22 of the panel have been made so as allow the mounting block 14 to directly abut the outer shell member 25. The opening for the burner 10 in the side wall panel 23 is cut in the outer shell member 25 and aligned with the apertures formed in the mounting block 14 and the panel insert 46. Similarly, FIG. 12 is a partially cross-sectioned detailed side view of the improved mounting arrangement for apparatus in an electric arc furnace using the mounting block illustrated in FIGS. 7–10 which is used with a side wall panel 23 of the furnace of the spray bar type. The burner 10 is mounted through an opening in the spray bar panel 50 and inner shell member 52. The burner 10 may be elongated to span the openings and slide mounts in the apertures in the mounting block 14 and insert panel 46 which are aligned with the openings.

In both FIGS. 11 and 12, the mounting block 14 mounts the discharge opening of the burner 10 over the step 24 between the hearth 21 and the side wall panel 32 and directs the flow form the burner toward the melt 18. As shown, the burner produces a supersonic oxygen stream which penetrates the slag, or foamy slag, 16 and the melt 18 at a 45 degree angle for providing an optimum process reaction. Preferably, the burner 10 has the capability of shrouding the supersonic oxygen flow with an outer flame envelope to produce an even higher penetrating power by the oxygen stream. The mounting arrangement reduces the height h of the discharge opening of the burner above the surface of the melt 18 and its overall distance d to the melt surface, the improvement depending on where the burner was mounted previously and at what angle. The mounting of the discharge opening of the burner 10 closer to the surface of the melt and closer to the center of the furnace without destroying the burner increases its process efficiency greatly. Process efficiency is also enhanced because an optimum angle of supersonic oxygen flow can be used without degradation of the step or having to increase flow rates to produce the optimum depth of oxygen flow in the melt 18.

While the invention has been described in connection with a preferred embodiment, this specification is not intended to limit the scope of the invention to the particular forms set forth, but, on the contrary, it is intended to cover any such alternatives, modifications, and equivalents as may be included within the spirit and scope of the invention as defined by the appended claims. For example, the mounting block and panel insert combination are described as thermally conductive and fluid cooled. It is evident that at least some of the benefits and advantages of these elements described herein could also be provided if they were made of a thermally resistive material such as refractory or the like. It is also evident that either element of the combination could be thermally resistive and the other thermally conductive. It is further evident that if one or more of the elements are thermally resistive, they may or may not need supplemental cooling, such as the described fluid cooling.

What is claimed is:

1. A mounting arrangement for an apparatus with a discharge end in a furnace having a hearth of refractory material which collects molten metal and a plurality of fluid cooled panels forming a side wall and having a step between the side wall and the hearth, said mounting arrangement comprising:

a fluid cooled side wall panel with an aperture adapted to receive the apparatus;

a fluid cooled cast iron mounting block resting on said step inside of said side wall, said mounting block having a front area adapted to face the inside of the furnace and containing a recess, a back area adapted to face said side wall panel, the width between said front area and back area approximately equal to the width of said step, and a porch at said front area having a corrugated slope toward the inside of the furnace for deflecting charged scrap away from said mounting block while maintaining a slag covering, said mounting block further having an aperture adapted to receive the apparatus;

a fluid cooled copper insert mounting in said recess and having an aperture adapted to receive the apparatus;

wherein said side wall panel, mounting block and insert apertures are aligned at an mounting angle of up to 60 degrees from the horizontal to direct the discharge end of the apparatus toward the molten metal and wherein the apparatus when received through said side wall panel, mounting block and insert apertures has its discharge end extending past said step.

2. A mounting block for mounting an apparatus in a furnace having a hearth of refractory material which collects molten metal and a plurality of fluid cooled panels forming a side wall and having a step between the side wall and the health, said mounting block comprising:

a fluid cooled block resting on the step inside of said side wall;

said mounting block including a front area adapted to face the inside of the furnace and containing a recess, a back area adapted to face said side wall, and a width between said front area and back area approximately equal to the width of the step;

an aperture extending form said front area to said back area and adapted to receive the apparatus;

a porch having a corrugated slope toward the inside of the furnace for deflecting charged scrap away from said mounting block while maintaining a slag covering, a fluid cooled copper insert mounting in said recess and having an aperture adapted to receive the apparatus; and wherein said mounting block aperture and insert aperture are aligned at an mounting angle of between 30 and 60 degrees from the horizontal to direct the apparatus toward the molten metal and wherein the discharge end of the apparatus when received through said block aperture and insert aperture extends past the step.

3. A mounting arrangement for an apparatus with a discharge end in a furnace having a hearth of refractory material which collects molten metal and a plurality of fluid cooled panels forming a side wall and having a step between the side wall and the hearth, said mounting arrangement comprising:

a mounting block having a width approximately equal to the width of the refractory step, said mounting block having a first aperture adapted to receive the apparatus and means for deflecting scrap charged in the furnace away from said mounting block; and a wall panel with a second aperture adapted to receive the apparatus and aligned with said first aperture;

wherein the apparatus when received through said first and second apertures has its discharge end extending past said step.

4. A mounting arrangement for an apparatus as set forth in claim 3 wherein:

said first aperture is aligned at a mounting angle to direct the discharge end of the apparatus toward the molten metal.

5. A mounting arrangement for an apparatus as set forth in claim 4 wherein:

said mounting angle is up to 60 degrees from the horizontal.

6. A mounting arrangement for an apparatus as set forth in claim 3 wherein:

said mounting angle is such that a discharge from the apparatus impinges on the molten metal at between 30–60 degrees from the horizontal.

7. A mounting arrangement for an apparatus as set forth in claim 3 wherein:

said mounting block is fluid cooled.

8. A mounting arrangement for an apparatus as set forth in claim 3 wherein:

said mounting block is manufactured from a material with a high thermal conductivity.

9. A mounting arrangement for an apparatus as set forth in claim 3 wherein:

said mounting block is manufactured from cast iron.

10. A mounting arrangement for an apparatus as set forth in claim 3 wherein:

said mounting block has a front area adapted to face the inside of the furnace, and a back area adapted to face said wall panel.

11. A mounting arrangement for an apparatus as set forth in claim 10 wherein:

said front area of said mounting block includes a recess an insert having a third aperture adapted to receive the apparatus and aligned with the first and second aperture; and said insert mounting in said recess and made of a material of high thermal conductivity or thermal resistance or a combination of high thermal conductivity and high thermal resistance.

12. A mounting arrangement for an apparatus as set forth in claim 11 wherein:

said thermally conductive insert is fluid cooled and is made of a material with the same as or a higher thermal conductivity than said mounting block.

13. A mounting arrangement for an apparatus as set forth in claim 3 wherein said means for deflecting scrap includes:

a porch sloped toward the inside of the furnace.

14. A mounting arrangement for an apparatus as set forth in claim 13 wherein:

said mounting block includes slag retaining means which retains slag to insulate the block from furnace beat.

15. A mounting arrangement for an apparatus as set forth in claim 14 wherein:

said slag retaining means includes square corrugations located on said porch.

* * * * *